United States Patent [19]

Racine

[11] Patent Number: 4,845,893
[45] Date of Patent: Jul. 11, 1989

[54] BALANCED COOKWARE CONSTRUCTION

[76] Inventor: John P. Racine, 2602 Jacqueline Dr., Apt. F10, Wilmington, Del. 19810

[21] Appl. No.: 155,106

[22] Filed: Feb. 11, 1988

[51] Int. Cl.$^4$ .................. A47J 37/10; A47G 19/22
[52] U.S. Cl. .................................. 99/422; 99/324; 126/390; 220/69; 220/70; 220/90.4
[58] Field of Search .................. 99/422–425, 99/324, 646 C; 126/390; 220/69, 70, 90.2, 90.4

[56] References Cited

U.S. PATENT DOCUMENTS

| Re. 4,619 | 10/1871 | Lee | 99/422 X |
|---|---|---|---|
| 110,408 | 12/1870 | Walker . | |
| D. 230,460 | 2/1974 | Gulotta . | |
| 610,285 | 9/1898 | Scoles | 220/70 |
| 1,398,655 | 11/1921 | Smith . | |
| 2,632,319 | 3/1953 | Adrian | 220/70 |
| 2,671,326 | 3/1954 | Pickering et al. | 220/90.4 X |
| 2,788,561 | 4/1957 | Mueller . | |
| 2,841,137 | 7/1958 | Chace | 126/390 |
| 3,903,641 | 9/1975 | Hoffmann et al. | 220/69 X |
| 4,352,324 | 10/1982 | Noh . | |

FOREIGN PATENT DOCUMENTS 337313  10/1930  United Kingdom .................. 99/422

Primary Examiner—Harvey C. Hornsby
Assistant Examiner—Stephen F. Gerrity
Attorney, Agent, or Firm—Leon Gilden

[57] ABSTRACT

Balanced cookware construction is set forth wherein the typically unbalanced construction of cookware is balanced by the inclusion of counter-balance weight material sandwiched within a forward portion of cookware diametrically opposite the securement position of handles to such cookware. The counter-balance material is secured between laminated layers of the cookware for ease of cleaning, storage with comparable utensils, and effecting complete surface positioning of the underside of cookware to a heating surface utilized with cookware.

3 Claims, 4 Drawing Sheets

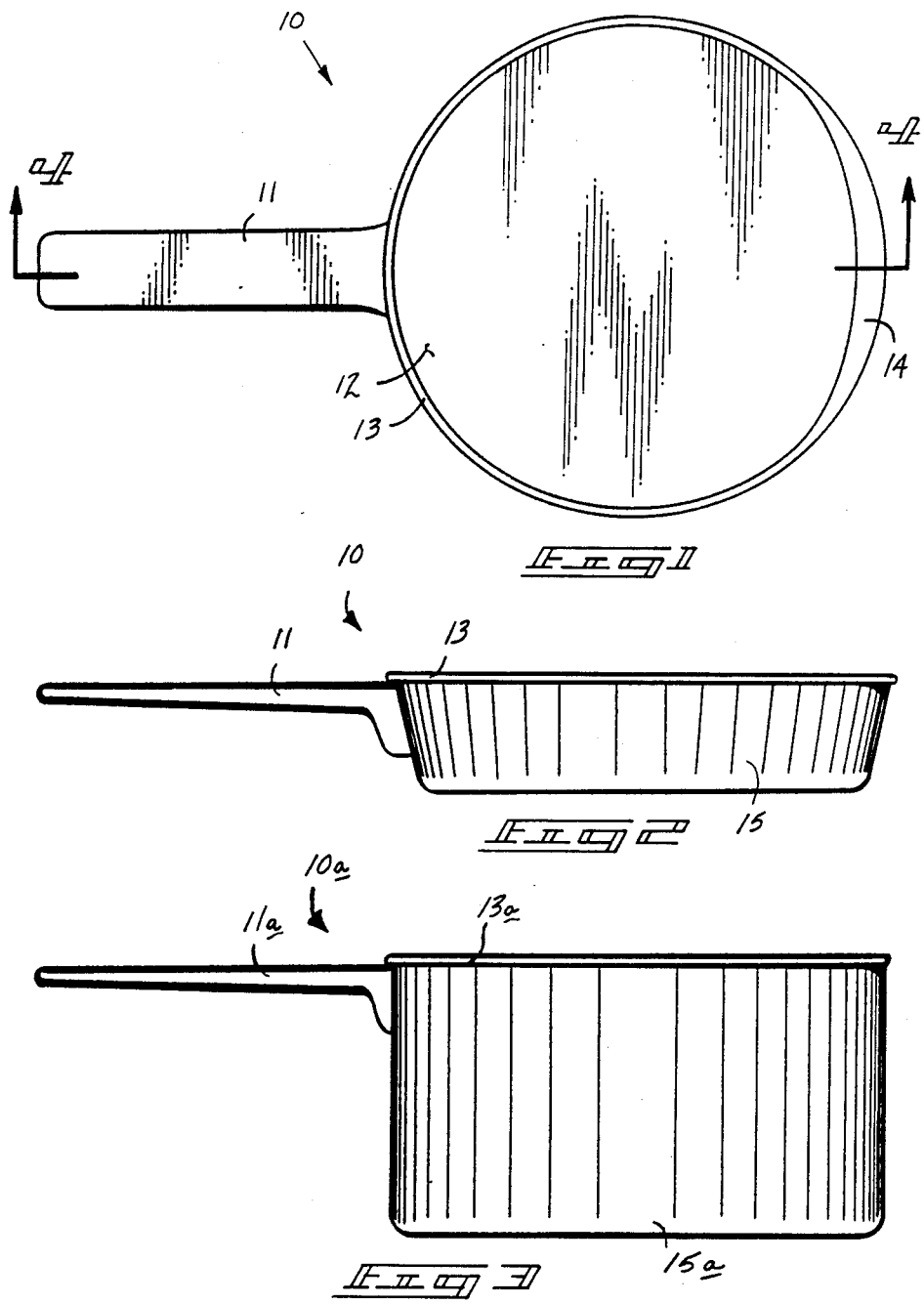

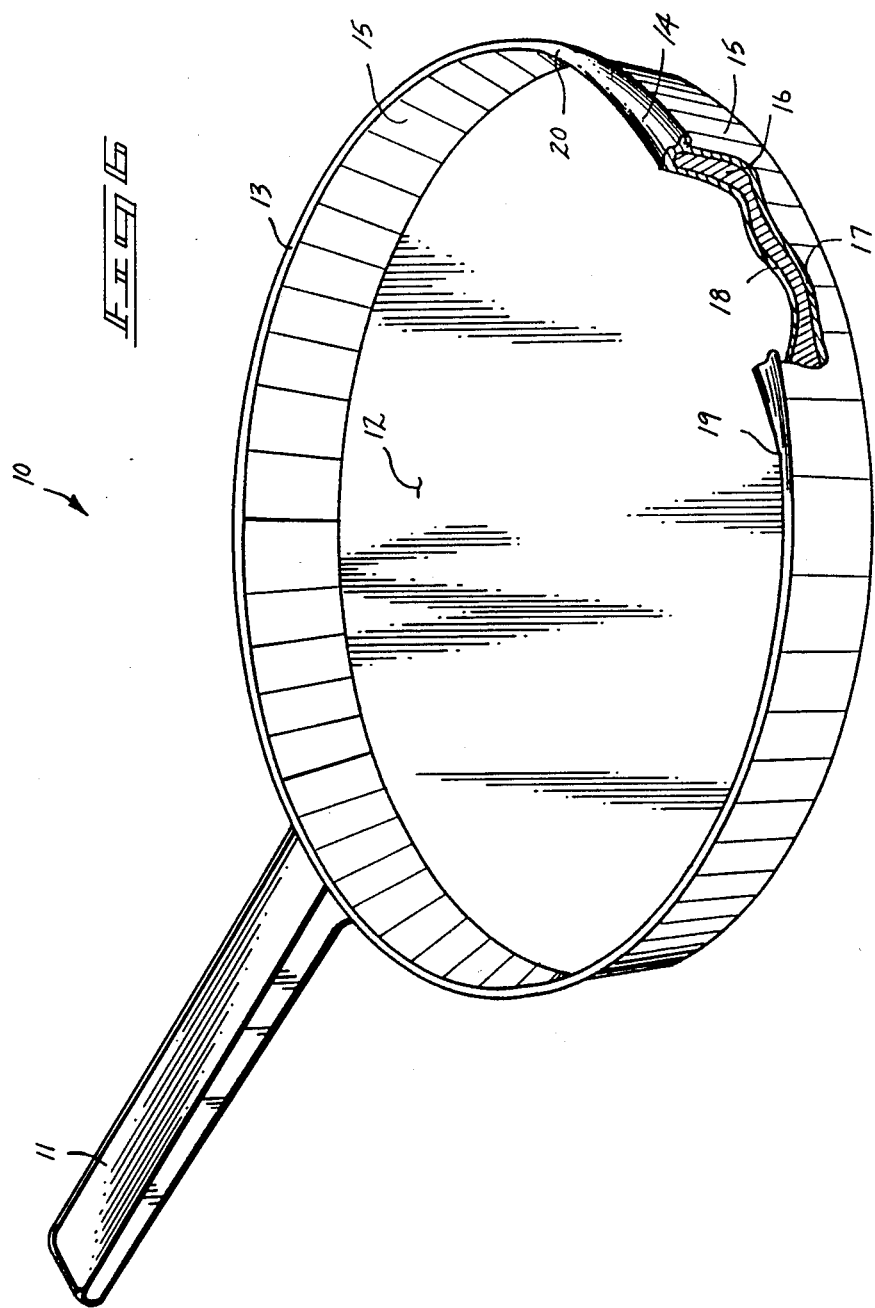

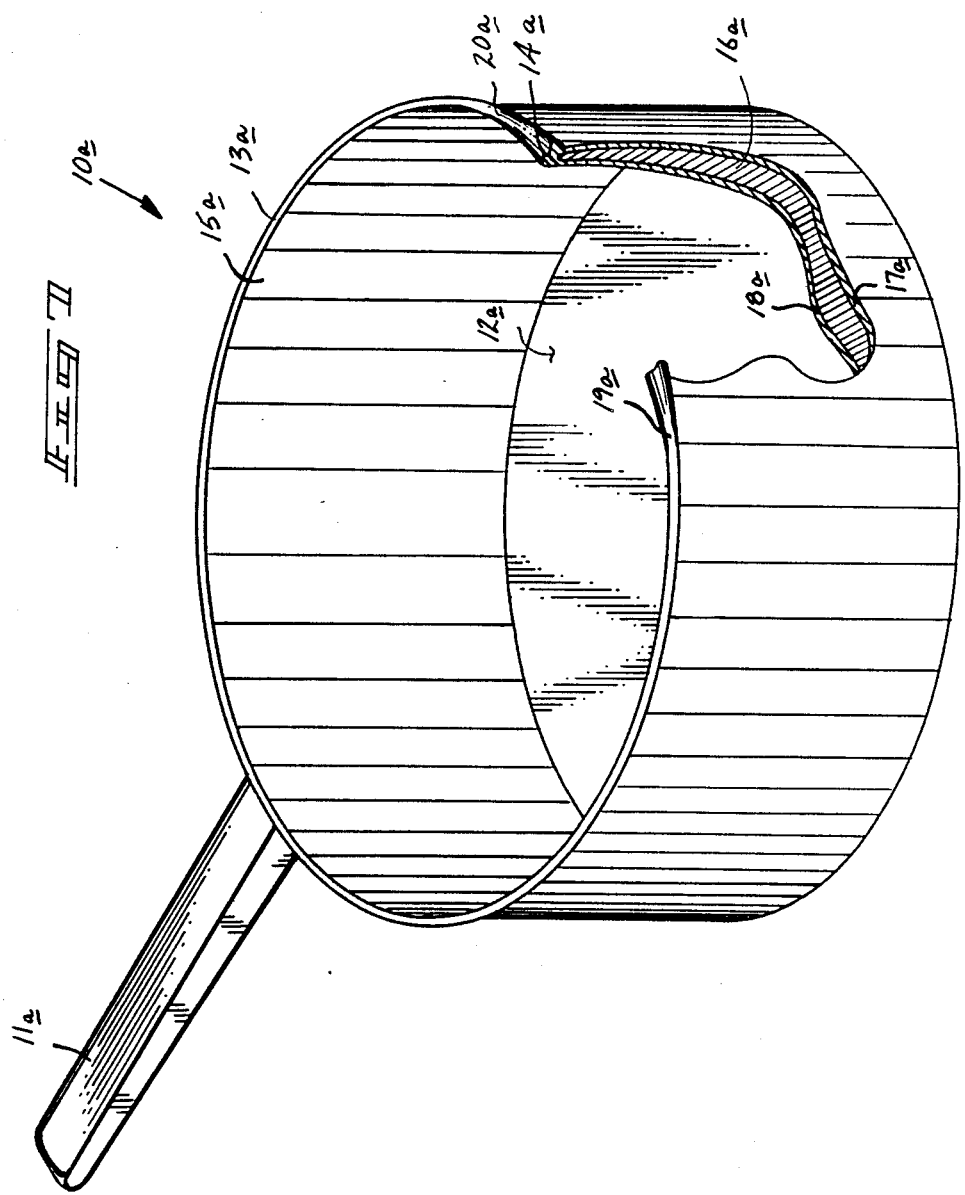

BALANCED COOKWARE CONSTRUCTION

BACKGROUND OF THE INVENTION

1. Field of the Invention

The present invention relates to cookware apparatus, and more particularly pertains to a new and improved balanced cookware construction wherein the same includes a forwardly positioned counter-balance weight to offset the moment of force created by a conventionally associated handle.

2. Description of the Prior Art

The use of cookware and the like is well known in the prior art and as may be appreciated, these devices have normally been of conventional construction with a main open container formed within a fixed handle thereto. Conventional cookware is formed of typical metal forming means, such as stamping, casting, and/or spinning. Resultantly, the main cooking container portion is balanced about a central center of gravity positioned somewhat medially of the bottom cooking surface of the pan with an attendant handle offsetting this balance and thereby positioning the center of gravity of the cookware towards a rear vertical wall of such cookware proximate the handle positioning. With limited cooking material positioned within the cookware, the cookware tends to tip towards the handle portion and is thereby does not presenting a full cooking surface in association with a conventional heating element, such as in a gas or electric stove. In this connection, there is extensive history of cookware which is utilized to provide efficient and effective cooking of various foods and the like positioned within such cookware. For example, U.S. Pat. No. Des. 230,460 illustrates a conventional cooking pan with a forwardly positioned tab with a hole therethrough apparently for the positioning tab with a like therethrough for storage of the pan. The patent is of interest only in the positioning of a forwardly oriented off-center tab in relation to a frypan.

U.S. Pat. No. 1,398,655 to Smith illustrates a turnover pan with a forwardly overlying lip in opposed relationship to a handle whereby the lip is utilized in the patent environment and teaching for the turning of an egg or the like, but the Smith patent does set forth an interesting forwardly oriented offset weight for a different purpose and structure to the instant invention.

U.S. Pat. No. 2,788,561 to Mueller sets forth a method of firing pottery with transmitting elements described as firing feet associated with a pan but of incidental construction in the cookware contemplated by Mueller.

U.S. Pat. No. 4,352,324 to Noh presents a frying pan with a removable grease catcher for the prevention of the accumulation of hot cooking oil or the like in the utilization of the frying pan. An opening positioned proximate and underlying the handle of the frypan presents itself to an underlying catch basin for the capture of grease but the Noh patent, as is typical of prior art teachings, merely aggravates the already unbalanced condition of the frypan and as typical of such construction, may in fact be dangerous as the grease and hot foods contained within such a frypan effect a greater tendency of the pan to tip.

As such, it may be appreciated that there exists a continuing need for a new and improved balanced cookware construction wherein the same presents construction for the balancing of an associated handle attached to such cookware for improved cooking, storage, and ease of use of such cookware, and in this respect, the present invention substantially fulfills this need.

SUMMARY OF THE INVENTION

In view of the foregoing disadvantages inherent in the known types of conventional cookware now present in the prior art, the present invention provides an balanced cookware construction wherein the same provides a forwardly positioned counter-balanced weight sandwiched between walls of an associated cooking utensil which may be readily stored, washed, and enables effective surface contact and, especially, a flat cooking surface with a cooking unit during use. As such, the general purpose of the present invention, which will be described subsequently in greater detail, is to provide a new and improved balanced cookware utensil which has all the advantages of the prior art cookware utensils and none of the disadvantages.

To attain this, the present invention comprises the use of a traditional cooking pot with an associated handle with a diametrically opposed counter-balancing weight secured integrally to the cookware wherein the cookware is resultantly balanced medially of the central open chamber. The construction enables the cookware to be most efficiently utilized with heating surfaces presenting a complete cooking surface of the cooking utensil in contiguous relationship to a heating surface minimizing the danger of tipping or spillage during use of the cookware and ensuring even, uniform cooking by providing a flat surface. This results in an improved ability to cook foods, especially fine foods such as creeps, omelettes and eggs as well as food like pancakes, which in a poor pan burns on one part while you try to cook the uncooked part.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved balance cookware construction which has all the advantages of the prior art cookware construction and none of the disadvantages.

It is another object of the present invention to provide a new and improved balanced cookware construction which may be easily and efficiently manufactured and marketed.

It is a further object of the present invention to provide a new and improved balanced cookware construction which is of a durable and reliable construction.

An even further object of the present invention is to provide a new and improved balanced cookware construction which is susceptible of a low cost of manufacture with regard to both materials and labor, and which accordingly is then susceptible of low prices of sale to the consuming public, thereby making such cookware construction economically available to the buying public.

Still yet another object of the present invention is to provide a new and improved balanced cookware construction which provides in the apparatuses and methods of the prior art some of the advantages thereof, while simultaneously overcoming some of the disadvantages normally associated therewith.

Still another object of the present invention is to provide a new and improved balanced cookware construction wherein a counter-balancing weight is positioned in a diametrically opposed relationship to an associated handle of a cooking utensil.

Yet another object of the present invention is to provide a new and improved balanced cookware construction wherein a counter-balancing weight integrally formed with the cookware is of a mass to counter-balance the moment arm of an associated handle of the cookware wherein the resultant force is medically located of the central cooking chamber.

These together with other objects of the invention, along with the various features of novelty which characterize the invention, are pointed out with particularly in the claims annexed to and forming a part of this disclosure. For a better understanding of the invention, its operating advantages and the specific objects attained by is uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top orthographic view of the invention.

FIG. 2 is a side orthographic view of the invention, as illustrated in FIG. 1.

FIG. 3 is a side orthographic view of a modified cooking utensil of FIG. 1 of increased depth.

FIG. 6 is an isometric view of the utensil of FIG. 1 in a partially cutaway forward portion to illustrate the various parts, their configuration, and relationship.

FIG. 7 is an isometric view of the utensil of FIG. 3 in a partially cutaway forward section illustrating the various parts, their configuration, and relationship.

DESCRIPTION OF THE PREFERRED EMBODIMENT

Figure 4:
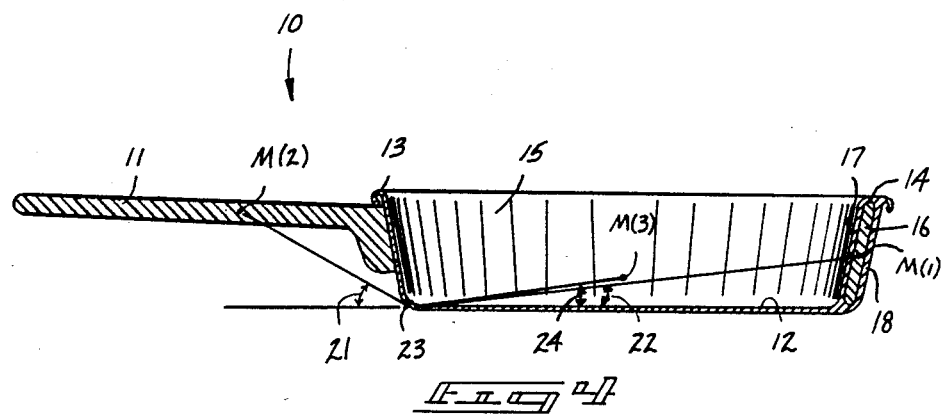
FIG. 4 is a side orthographic view of the invention taken along the lines 4—4 of FIG. 1.

With reference now to the drawings, and in particular to FIGS. 1 to 7 thereof, a new and improved balanced cookware construction embodying the principles and concepts of the present invention and generally designated by the reference numerals 10 and 10a will be described.

Figure 5:
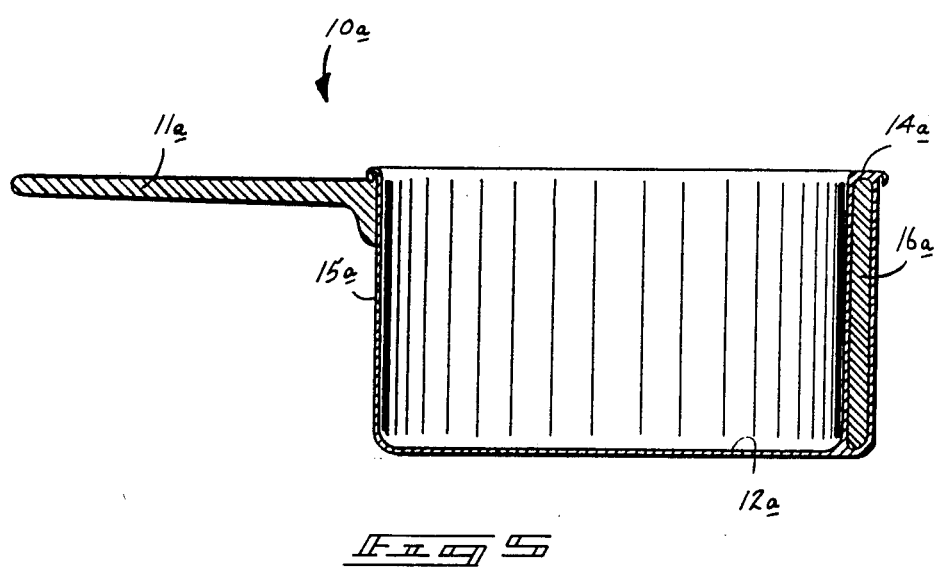
FIG. 5 is a side orthographic view in section of the invention, as illustrated in FIG. 3.

More specifically, it will be noted that the balanced cookware construction 10 essentially comprises a conventional cooking utensil which includes a handle 11, a base 12, terminating upwardly into a flare 13 with a wide forward edge flare 14. A peripheral side wall 15 has secured in a forwardmost position a counter-weight 16, as illustrated in FIGS. 4 and 6, in the shallow part of FIG. 1 and a counter-weight 16a in the deeper balanced cookware 10a. The counter-weight 16 of illustration in FIG. 4 and 6 and counter-weight 16a of FIGS. 5 and 7 is sandwiched in a laminated manner between an exterior wall 18 and an interior wall 17, as illustrated in FIGS. 4 and 6. It is contemplated that side wall 15 be divided to form the interior and exterior walls respectively 17 and 18, and 17 and 18a, per FIGS. 5 and 7. If desired, however, the cookware of the instant invention may be formed with a double wall that may simply part at first and second terminal portions 19 and 20, as illustrated in FIG. 6 and 19a and 20a, as illustrated in FIG. 7.

The weight of counter-weight 16 or 16a is carefully selected dependent upon the application and may possess a density greater or less than that utilized in the fabrication of the cookware to balance same. With attention to FIG. 4, the selection of the appropriate weight of counter-weight 16 shall be described. M(2) presented as the center of gravity of handle 11 with M(1) as the center of gravity of counter-weight 16. The center of gravity of the central bowl-like portion formed of side walls 15 and base 12 is illustrated centrally positioned as M(3). A typically tipping portion 23 is illustrated as conventional positioning of the fulcrum of a utensil that is prone to tipping. Accordingly, to balance the present moments of force, the equation may be written as follows where: $M(1) = (M(2) \times L(2)) - (M(3) \times L(3))/L(1)$. This equation and the relationship it expresses assumes that the cookware would otherwise balance if the counter-weight and handle were not present.

However, if this is not the case, the mass and necessary position of the counterweight can still be precisely determined - the mathematics are more complicated is all.

In the equation above L(1) is the distance from M(1) to portion 23 and may be expressed as the linear distance between M(1) and portion 23 multiplied by the cosine of angle 22 and L(2) is the distance from M(2) to portion 23 multiplied by the cosine of angle 21. Accordingly, L(3) is the distance from M(3) to portion 23 and is at linear distance multiplied by the cosine of indicated angle 24. To simplify the equation as the acceleration of gravity is constant, the mass in this environment is equal to the weight expressed in a desired form, such as ounces, pounds, etc.

It is to be understood the counter-weight material utilized with the instant invention is preferably of a denser material then the material utilized in the construction of the balanced cookware 10. Ideally, the counter-weight 16 will be formed of material of a relatively high melting point preferably greater than that of the boiling point of water. The counter-weight may also be merely formed of the same type of material, be it metal or ceramic, as is the basic cookware 10 forming the base and side wall portions.

As to the manner of usage and operation of the present invention, the same should be apparent from the above description. Accordingly no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as being new and desired to be protected by LETTERS PATENT of the United States is as follows:

1. A balanced cookware utensil comprising,
   a heating surface including a base and a side wall means defining a perimeter of said utensil formed directly upwardly from said base to form a containment means for the heating of contents positionable within said container means, and
   a handle integrally secured to said side wall means directed outwardly from said wall means, and
   a counter-balance means integrally secured to the side wall means at a position on the side wall means opposed to the handle, and
   wherein said containment means is formed with a generally cylindrical cross-sectional shape and said counter-balance means is diametrically opposed to the position of the handle, and
   wherein said side wall means includes a plurality of spaced side walls, and
   said counter-balance means is laminated between said plurality of spaced side walls wherein said side walls are formed along a limited portion of said perimeter, and
   wherein said counter-balance means comprises a material of greater density than material forming said side wall means, said base and said handle to effect a balancing of said side wall means, said base, and said handle by said counter-balance means.

2. A balanced cookware utensil is set forth in claim 1 wherein the weight of the counter-balance means is determined from the equation: $M(1) = (M(2) \times L(2)) - (M(3) \times L(3))/L(1)$; wherein $M(1)$ is the weight of the said counter-balance means, $M(2)$ is the weight of the handle means and $M(3)$ is the weight of the containment means minus the counter-balance means and $L(1)$ is the horizontal distance from $M(1)$ to a tipping point proximate the handle means, $L(2)$ is a horizontal distance from $M(2)$ to a tipping point proximate the handle means, $L(3)$ is a horizontal distance from "M" (3) to a tipping point proximate the handle means.

3. A balanced cookware utensil as set forth in claim 1 wherein a tipping point is positioned at a juncture at the intersection of the side wall means and said base directly underlying said handle means.

* * * * *